(12) United States Patent
Shinozaki (10) Patent No.: US 11,060,240 B2
(45) Date of Patent: Jul. 13, 2021

(54) SYNTHETIC LEATHER (71) Applicant: SEIREN CO., LTD., Fukui (JP)

(72) Inventor: Michio Shinozaki, Fukui (JP)

(73) Assignee: SEIREN CO., LTD., Fukui (JP)

( * ) Notice: Subject to any disclaimer, the term of this patent is extended or adjusted under 35 U.S.C. 154(b) by 0 days.

(21) Appl. No.: 16/625,935

(22) PCT Filed: Jun. 26, 2018

(86) PCT No.: PCT/JP2018/024135
§ 371 (c)(1),
(2) Date: Dec. 23, 2019

(87) PCT Pub. No.: WO2019/004180
PCT Pub. Date: Jan. 3, 2019

(65) Prior Publication Data
US 2020/0157736 A1 May 21, 2020

(30) Foreign Application Priority Data
Jun. 27, 2017 (JP) .............................. JP2017-125599

(51) Int. Cl.
*D06N 3/14* (2006.01)
*D04B 1/10* (2006.01)
(Continued)

(52) U.S. Cl.
CPC ................ *D06N 3/14* (2013.01); *D04B 1/10* (2013.01); *D06C 7/02* (2013.01); *D06C 11/00* (2013.01);
(Continued)

(58) Field of Classification Search
CPC ...... D06N 3/14; D06N 3/0009; D06N 3/0075; D06N 3/141; D04B 1/10; D06C 7/02;
(Continued)

(56) References Cited

U.S. PATENT DOCUMENTS 4,476,186 A * 10/1984 Kato ........................ D04H 1/49
156/148
5,254,399 A * 10/1993 Oku ........................ D21H 13/10
428/373

(Continued)

FOREIGN PATENT DOCUMENTS

| JP | 6-294077 A | 10/1994 |
|---|---|---|
| JP | 9-31862 A | 2/1997 |

(Continued)

OTHER PUBLICATIONS

International Search Report dated Sep. 18, 2018, issued in counterpart International Application No. PCT/JP2018/024135, with English translation (1 page).

(Continued)

*Primary Examiner* — Nathan L Van Sell
(74) *Attorney, Agent, or Firm* — Westerman, Hattori, Daniels & Adrian, LLP (57) ABSTRACT

Provided is synthetic leather with wrinkling and springiness similar to those of natural leather. The synthetic leather has a grain pattern and is obtained by laminating a polyurethane resin layer on a fibrous substrate. A stiffness of the front surface of the synthetic leather is 65 to 95 mm and a stiffness of a rear surface of the synthetic leather is 55 to 85 mm.

12 Claims, 2 Drawing Sheets (51) Int. Cl.
*D06C 7/02* (2006.01)
*D06C 11/00* (2006.01)
*D06N 3/00* (2006.01)

(52) U.S. Cl.
CPC ....... *D06N 3/0009* (2013.01); *D10B 2331/04* (2013.01)

(58) Field of Classification Search
CPC ..... D06C 11/00; D10B 2331/04; B32B 27/12; B32B 27/40
See application file for complete search history.

(56) References Cited

U.S. PATENT DOCUMENTS

| | | | |
|---|---|---|---|
| 5,648,151 A * | 7/1997 | Mizoguchi | C08G 18/4202 |
| | | | 428/220 |
| 5,798,165 A * | 8/1998 | Mizoguchi | C08G 18/4202 |
| | | | 428/160 |
| 5,993,944 A | 11/1999 | Honna et al. | |
| 6,599,849 B1 * | 7/2003 | Vogt | B32B 5/02 |
| | | | 442/104 |
| 2007/0111620 A1 * | 5/2007 | Ono | B32B 27/12 |
| | | | 442/104 |
| 2010/0216905 A1 * | 8/2010 | Kuwamura | C08G 18/0823 |
| | | | 521/170 |
| 2012/0207955 A1 * | 8/2012 | Ogata | D01F 8/14 |
| | | | 428/35.5 |
| 2013/0072623 A1 * | 3/2013 | Krabbenborg | C09D 153/00 |
| | | | 524/528 |
| 2015/0050438 A1 * | 2/2015 | Ogata | D03D 13/008 |
| | | | 428/35.2 |

FOREIGN PATENT DOCUMENTS

| | | | |
|---|---|---|---|
| JP | 3071383 B2 | 7/2000 | |
| JP | 2002-371478 A | 12/2002 | |
| JP | 2005-194664 A | 7/2005 | |
| JP | 2007-247079 A | 9/2007 | |
| JP | 2012-127010 A | 7/2012 | |
| JP | 2013-072141 A | 4/2013 | |
| JP | 2013-234409 A | 11/2013 | |
| WO | 97/40230 A1 | 10/1997 | |
| WO | WO-9740230 A1 * | 10/1997 | ............... D04H 1/06 |
| WO | WO-2015001732 A1 * | 1/2015 | ........... D06N 3/0009 |
| WO | 2015/136921 A1 | 9/2015 | |
| WO | 2015/001732 A1 | 1/2018 | |

OTHER PUBLICATIONS

Extended European Search Report dated Jun. 9, 2020, issued in counterpart European Patent Application No. 18823044.5 (in English; 7 pages).

* cited by examiner

SYNTHETIC LEATHER

TECHNICAL FIELD

The present invention relates to synthetic leather.

BACKGROUND ART

In the related art, synthetic leather has been used as an alternative to natural leather or as a leather material with more satisfactory physical properties than natural leather for various purposes. Such synthetic leather is typically formed by laminating a polyurethane resin layer on a base material (for example, non-woven fabric, woven fabric, a knitted fabric, or the like) made of fiber in order to obtain natural leather-like touch feeling and texture feeling.

For example, PTL 1 discloses synthetic leather in which a surface layer is formed on a fibrous substrate coated or/and impregnated with a urethane-based resin W/O-type dispersion. PTL 1 discloses that in this manner, it is possible to obtain synthetic leather with an excellent texture feeling, wrinkling, and a feeling of volume although it is obtained in a simple manufacturing process similarly to a dry method.

Also, PTL 2 discloses synthetic leather in which a weft knitted fabric with a circular interlock knitted structure is used as a fibrous substrate and a polyurethane resin surface layer formed from a silicone-modified non-yellowing polycarbonate-based polyurethane resin is laminated on the surface of the fibrous substrate with a polyurethane adhesive layer interposed therebetween. PTL 2 describes that a grain depth, a texture feeling, wrinkling, and a feeling of volume similar to those of natural leather are achieved, excellent light resistance, hydrolysis resistance, thermal degradation resistance, abrasion resistance, oleic acid resistance, and the like are achieved, and excellent moldability and formativeness are achieved in this manner.

However, the synthetic leather according to PTLs 1 and 2 cannot sufficiently reproduce wrinkling and springiness unique to natural leather, and there are still rooms for improvement in wrinkling and springiness.

CITATION LIST

Patent Literature

PTL 1: JP-A-6-294077
PTL 2: Japanese Patent No. 3071383

SUMMARY OF INVENTION

Technical Problem

Embodiments of the invention have been made in view of such circumstances, and an object thereof is to provide synthetic leather with wrinkling and springiness similar to those of natural leather.

Solution to Problem

According to an embodiment of the invention, there is provided synthetic leather including: a fibrous substrate; and a polyurethane resin layer that is formed on the fibrous substrate. The synthetic leather has a grain pattern on a front surface. A stiffness of the front surface of the synthetic leather is 65 to 95 mm and a stiffness of a rear surface is 55 to 85 mm.

Advantageous Effects of Invention

According to the invention, it is possible to provide synthetic leather with wrinkling and springiness similar to those of natural leather.

DESCRIPTION OF EMBODIMENTS

Synthetic leather according to an embodiment is synthetic leather that has a grain pattern obtained by laminating a polyurethane resin layer on a fibrous substrate. That is, the synthetic leather includes a fibrous substrate and a polyurethane resist layer formed on the fibrous substrate and has a grain pattern on the front surface. Stiffness of the front surface of the synthetic leather is 65 to 95 mm, and stiffness of the rear surface is 55 to 85 mm.

The front surface of the synthetic leather means a surface (designed surface) that can be viewed when the synthetic leather is used, out of the front and rear surfaces of the synthetic leather. That is, the front surface is a surface on the side of the polyurethane resin layer in the synthetic leather including the fibrous substrate and the polyurethane resin layer and is a surface to which the grain pattern is applied. The rear (back) surface of the synthetic leather means a surface on the side opposite to the front surface.

A balance of stiffness on the front and rear sides of the synthetic leather becomes as satisfactory as that of natural leather by the stiffness of the front surface of the synthetic leather being 65 to 95 mm and the stiffness of the rear surface being 55 to 85 mm. Therefore, it is possible to obtain synthetic leather with wrinkling and springiness similar to those of natural leather. In addition, the stiffness of the front surface may be higher or lower than the stiffness of the rear surface.

It is possible to obtain springiness similar to that of natural leather by the stiffness of the front surface and the rear surface of the synthetic leather being equal to or greater than the lower limit values. It is possible to obtain a satisfactory texture feeling (flexibility) by the stiffness of the front surface and the rear surface of the synthetic leather being equal to or less than the upper limit values.

Here, the stiffness means a value measured in accordance with the JIS L1096 8.21.1A method (45° cantilever method), and a smaller value indicates higher flexibility. The stiffness of the front surface is stiffness measured in a state in which the synthetic leather as a test piece is placed on a horizontal platform of a 45° cantilever-type tester such that the front surface thereof is directed to the upper side. The stiffness of the rear surface is stiffness measured in a state in which the aforementioned synthetic leather is turned over and is placed on the horizontal platform such that the rear surface is directed to the upper side.

Figure 1:
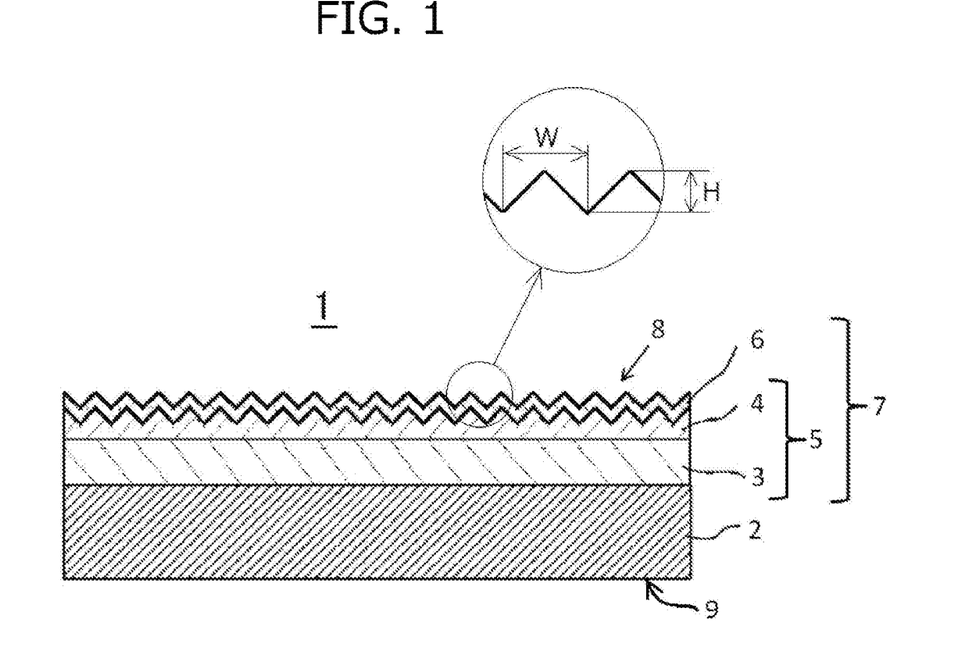
FIG. 1 is a schematic sectional-view of synthetic leather according to an embodiment

FIG. 1 schematically illustrates a sectional structure of synthetic leather 1 according to an embodiment. In the synthetic leather 1, a polyurethane resin layer 7 is provided on one surface of a fibrous substrate 2, the front surface of the polyurethane resin layer 7 corresponds to a front surface 8, and a grain pattern (that is, an uneven pattern) is provided on the front surface 8. The polyurethane resin layer 7 includes a first resin layer (colored layer) 4, a second resin layer (adhesive layer) 3, and a third resin layer (protective layer) 6, and the first resin layer (colored layer) 4 and the third resin layer (protective layer) 6 are laminated on the fibrous substrate 2 with the second resin layer (adhesive layer) 3 interposed therebetween in this example.

In addition, a similar grain pattern is formed not only in the front surface of the third resin layer (protective layer) 6 but also in the front surface of the first resin layer (colored layer) 4 below the third resin layer (protective layer) 6 in the embodiment illustrated in FIG. 1. In addition, the first resin layer (colored layer) 4 and the second resin layer (adhesive layer) 3 will be collectively referred to as a surface layer 5 in the embodiment illustrated in the drawing.

The height of grain in the grain pattern (uneven pattern) formed in the front surface of the synthetic leather is preferably equal to or greater than 50 μm, is more preferably equal to or greater than 90 μm, is further preferably equal to or greater than 100 μm, and is further preferably equal to or greater than 110 μm. Wrinkling similar to those in natural leather can be easily obtained when the height of the grain is set equal to or greater than 50 μm. An upper limit of the height of the grain is not particularly limited, and may be equal to or less than 200 μm, or may be equal to or less than 150 μm, for example.

Here, the height of grain in the grain pattern (uneven pattern) is an average value of height differences (H in FIG. 1) between projecting portions and recessed portions and is calculated as follows. That is, a vertical section of the synthetic leather is observed with a microscope (digital Microscope KH-7700 manufactured by Hirox Co., Ltd.), and a value obtained by subtracting an average value of values obtained by measuring height differences (distances) between bottoms of recessed portions and the lowest part of the synthetic leather at random ten locations from an average value of values obtained by measuring height differences (distances) between apexes of projecting portions and the lowest part of the synthetic leather at random ten locations is assumed to be the height of grain. Here, the lowest part of the synthetic leather is the rear surface of the synthetic leather represented by the reference numeral 9 in FIG. 1 (that is, the rear surface of the fibrous substrate).

The width of grain in the grain pattern (uneven pattern) formed on the front surface 8 of the synthetic leather is preferably equal to or greater than 580 μm, is more preferably equal to or greater than 1000 μm, is further preferably equal to or greater than 1300 μm, and is further preferably equal to or greater than 1400 μm. Wrinkling similar to those in natural leather can be easily obtained when the width of the grain is set equal to or greater than 580 μm. An upper limit of the width of the grain is not particularly limited, and may be equal to or less than 1800 μm, or may be equal to or less than 1600 μm, for example.

Here, the width of grain in the grain pattern (uneven pattern) is an average value of widths of the projecting portions (W in FIG. 1) and is calculated as follows. That is, the front surface of the synthetic leather is observed with a microscope (digital microscope KH-7700 manufactured by Hirox Co., Ltd.), the number of the grains (projecting portions) and the respective widths thereof in 1 cm (on a straight line of 1 cm) are measured at random five locations, and an average value of the widths is assumed to be the width of grain.

The rate of change in grain height in the grain pattern (uneven pattern) formed in the front surface 8 of the synthetic leather when the synthetic leather is bent is preferably 100 to 550%, is more preferably 200 to 450%, and may be 200 to 440%. Wrinkling similar to those in natural leather can be easily obtained when the rate of change in grain height is equal to or greater than 100% in the bending of the synthetic leather. It is possible to control coating lifting and grain lifting, which are observed when natural leather of rough fiber is used, by the rate of change in grain height being equal to or less than 550%.

Figure 2:
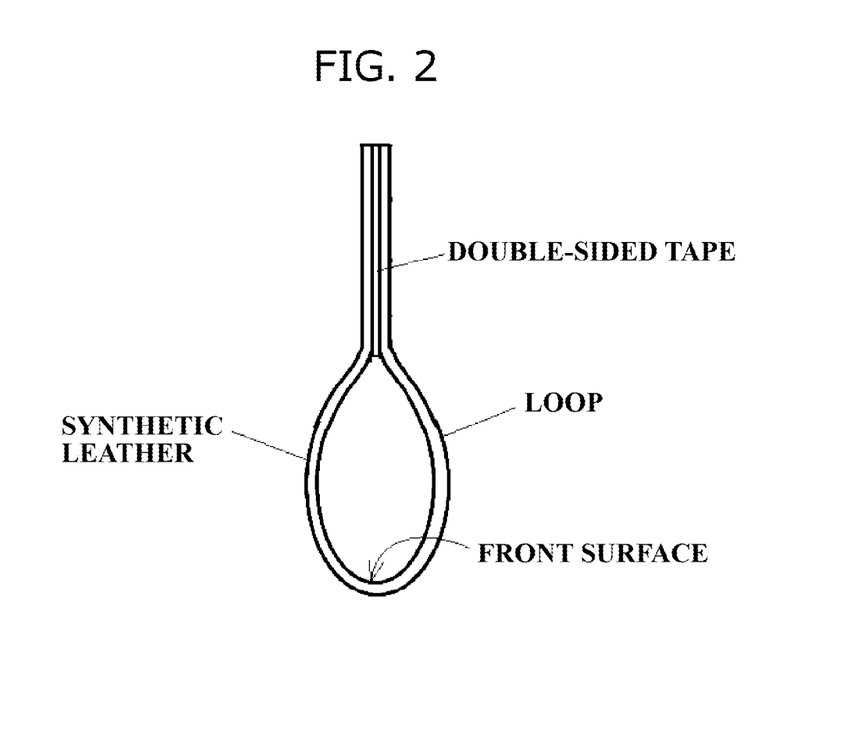
FIG. 2 is an explanatory view illustrating a method of bending the synthetic leather in measurement of the height of grain at the time of bending.

Here, the rate of change in grain height shown when the synthetic leather is bent is calculated as follows. That is, marks are applied to portions of 1.5 cm from both transverse ends of synthetic leather with a vertical size of 1 cm and a horizontal size of 6 cm such that a loop is formed at a portion of 3 cm at the center in the transverse direction as illustrated in FIG. 2, a double-sided tape is attached to the outside of the marks (the end side in the transverse direction), and the ends are attached to each other such that the marked portions overlap with each other and the front surface is located inside. A vertical section of the synthetic leather bent into a loop shape in this manner is observed with a microscope (digital microscope KH-7700 manufactured by Hirox Co., Ltd.), a value obtained by subtracting an average value of values obtained by measuring height differences between bottoms of recessed portions and the lowest part of the synthetic leather at random ten locations from an average value of values obtained by measuring height differences between apexes of projecting portions and the lowest part of the synthetic leather at random 10 locations is assumed to be the height of the grain when the synthetic leather is bent, and the rate of a change is calculated by the following equation.

Rate of change in grain height when synthetic leather is bent (%)=(height of grain when synthetic leather is bent−height of grain)÷(height of grain)×100

<Fibrous Substrate>

Examples of the fibrous substrate used in the synthetic leather according to the embodiment include fabrics such as a knitted fabric, a woven fabric, and a non-woven fabric. A fabric that has been coated or impregnated with a solvent-based or non-solvent-based (including water-based) polymer compound (preferably a polyurethane resin, a copolymer thereof, or a mixture containing a polyurethane resin as a main constituent) known in the related art and has been subjected to dry coagulation or wet coagulation can also be used. Among these, a knitted fabric is preferably used in terms of stretchability. The knitted fabric is not particularly limited, and examples thereof include a tricot fabric, a double-raschel fabric, and a circular knitted fabric. Among these, a circular knitted fabric is preferably used in terms of stretchability.

As a knitted structure of the circular knitted fabric, a knitted structure known in the related art can be used. A circular interlock knitted fabric is preferably used, in particular, among circular knitted fabrics in terms of minuteness, a feeling of weight, stretchability, sufficient elasticity, and stability with no rolling-up (curling at ends of the fabric). Examples of the circular interlock knitted structure of a circular knitted fabric include brush knitting, mock lodi knitting, smooth knitting (interlock stitch), ponte roma knitting, ripple knitting, milano rib knitting, and jacquard knitting. Among these, brush knitting is preferably used in terms of stretchability.

The type of the fiber used in the fibrous substrate is not particularly limited, examples thereof can include fiber known in the related art such as natural fiber, reproduced fiber, semi-synthetic fiber, and synthetic fiber, and two or more kinds thereof may be used in combination. Among these, synthetic fiber, in particular, polyester fiber is preferably used in terms of strength and workability.

The shape of the fiber used in the fibrous substrate is not particularly limited and may be either long fiber or short fiber. In addition, the sectional shape of the fiber is not particularly limited and may be not only an ordinary round shape but also an atypical shape such as a flat shape, a triangular shape, a hollow shape, a Y shape, a T shape, or a U shape.

The form of the yarn used in the fibrous substrate is not particularly limited and may be either a filament yarn (long fiber yarn) or a spun yarn (short fiber yarn), or further, or may be a long-short composite spun yarn as a combination of long fiber and short fiber. The filament yarn may be twisted as needed or may be provided with stretchability or bulkiness through false twisting, a fluid disturbance treatment, or the like.

Although the fineness of the yarn used in the fibrous substrate is not particularly limited, the yarn fineness is preferably 56 to 330 dtex and is more preferably 100 to 250 dtex. It is possible to prevent the stiffness of the obtained synthetic leather from being and to easily obtain springiness unique to natural leather by the yarn fineness being equal to or greater than 56 dtex. It is possible to prevent the stiffness of the synthetic leather from being high and to easily obtain wrinkling unique to natural leather by the yarn fineness being equal to or less than 330 dtex.

Although the single-fiber fineness of the yarn used in the fibrous substrate is not particularly limited, the single-fiber fineness is preferably 0.1 to 20 dtex in terms of improvement in adhesiveness between the fibrous substrate and the polyurethane resin layer.

Although the weight per area (mass per unit area) of the fibrous substrate is not particularly limited, the weight per area is preferably 350 to 600 $g/m^2$ and is more preferably 400 to 550 $g/m^2$, for example. It is possible to prevent the stiffness of the obtained synthetic leather from being low and to easily obtain springiness unique to natural leather by the weight per area being equal to or greater than 350 $g/m^2$. It is possible to prevent the stiffness of the synthetic leather from being high and to easily obtain wrinkling unique to natural leather by the weight per area being equal to or less than 600 $g/m^2$.

Although the thickness of the fibrous substrate is not particularly limited, the thickness is preferably 0.9 to 1.2 mm and is more preferably 1.0 to 1.2 mm. It is possible to prevent the stiffness of the obtained synthetic leather from being low and to easily obtain springiness unique to natural leather by the thickness being equal to or greater than 0.9 mm. It is possible to prevent the stiffness of the synthetic leather from being high and to easily obtain wrinkling unique to natural leather by the thickness being equal to or less than 1.2 mm.

One surface or both surfaces of the fibrous substrate may be raised surfaces. It is possible to adjust a porosity of the fibrous substrate and to set the stiffness of the obtained synthetic leather to a desired value by forming one surface or both surfaces as a raised surface or raised surfaces. Preferably, at least the surface on which the polyurethane resin layer is laminated may be a raised surface. For example, the fibrous substrate may be a circular knitted fabric with a circular interlock knitted structure with one surface or both surfaces that are formed as raised surfaces, and the polyurethane resin layer may be laminated on the raised surfaces.

Further, the porosity of the fibrous substrate may be adjusted in accordance with the shape of the grain of the synthetic leather. For example, it is possible to form wrinkles unique to natural leather by setting a small porosity for small grain and by setting a large porosity for large grain. That is, fine wrinkles can be formed for small grain, and rough wrinkles can be formed for large grain.

Preferably, the knitted fabric of the fibrous substrate according to the embodiment is caused to contract through a high-temperature and high-pressure dying process, and so-called width widening and/or width narrowing is then performed in a heat treatment process with a heat setter or the like in terms of stretchability. It is possible to obtain desired stiffness by adjusting the density and the stretchability of the knitted fabric through these processes.

<Polyurethane Resin Layer>

The synthetic leather according to the embodiment is obtained by laminating a polyurethane resin layer on the aforementioned fibrous substrate. The polyurethane resin layer is a generic term for layers that are made of a polyurethane resin that are formed on the fibrous substrate, and includes at least one layer, or can include two or more layers of the same or different compositions. For example, the polyurethane resin layer may include a first resin layer that serves as a colored layer and a second resin layer that serves as an adhesive layer for causing the first resin layer to adhere to the fibrous substrate (hereinafter, the first resin layer and the second resin layer will be collectively referred to as a "surface layer" in some cases). Further, the polyurethane resin layer may include the first resin layer, the second resin layer, and a third resin layer that serves as a protective layer for protecting the first resin layer. The polyurethane resin layer preferably includes the surface layer and the protective layer.

A surface of the fibrous substrate on which the polyurethane resin layer is laminated is not particularly limited and may be either the front surface or the rear surface of the fibrous substrate. In an embodiment in which one surface of the fibrous substrate is formed with a yarn with a smaller single-fiber fineness than that of the other surface, the polyurethane resin layer is preferably laminated on the one surface (hereinafter, referred to as a "smaller fineness surface") using the yarn with the smaller single-fiber fineness in terms of wrinkling. Since fine and irregular gaps are generated by thin nap in this manner, it is possible to obtain wrinkling unique to natural leather.

Although the amount of dry application (dry mass per unit area) of the polyurethane resin layer including both the surface layer and the protective layer is not particularly limited, the amount of dry application is preferably 120 to 320 $g/m^2$ and is more preferably 200 to 270 $g/m^2$. It is possible to prevent the stiffness of the synthetic leather from being low and to easily obtain springiness unique to natural leather by the amount of dry application being equal to or greater than 120 $g/m^2$. In addition, it is possible to prevent abrasion resistance of the synthetic leather from being damaged. It is possible to prevent the stiffness of the synthetic leather from being high and to easily obtain wrinkling unique to natural leather by the amount of dry application being equal to or less than 320 $g/m^2$.

Although the thickness of the polyurethane resin layer is not particularly limited, the thickness is preferably 120 to 320 μm and is more preferably 167 to 270 μm. It is possible to improve springiness and abrasion resistance by the thickness being equal to or greater than 120 µm. It is possible to improve wrinkling by the thickness being equal to or less than 320 µm.

<Surface Layer>

The surface layer is a part of the polyurethane resin layer laminated on the fibrous substrate, and includes at least one resin layer, or can include two or more resin layers of the same or different compositions. In FIG. 1, for example, the surface layer 5 includes the first resin layer 4 that serves as a colored layer and the second resin layer 3 that serves as an adhesive layer for causing the first resin layer 4 to adhere to the fibrous substrate 2.

As the polyurethane resin used in the surface layer, a polyurethane resin similar to that used in synthetic leather known in the related art can be used. A type and a layer configuration of the polyurethane resin are not particularly limited.

Examples of the polyurethane resin include a polyether-based polyurethane resin, a polyester-based polyurethane resin, and polycarbonate-based polyurethane resin, and one kind thereof can be used alone, or two or more kinds thereof can be used in combination. Among these, a polycarbonate-based polyurethane resin is preferably used in terms of durability. Also, the polyurethane resin in any form, such as a non-solvent-based (non-solvate medium-based) polyurethane resin, a hot-melt-based polyurethane resin, a solvent-based polyurethane resin, and water-based polyurethane resin can be used, and further, a polyurethane resin in any form such a one-solution-type polyurethane resin, a two-solution curing-type polyurethane resin, and moisture curing-type polyurethane resin can be used, and appropriate selection may be made in accordance with a purpose and utilization.

With the polyurethane resin, one kind of random constituents such as a crosslinking agent, a coloring agent (a pigment or a dye), a lubricant, and a thickener can be used alone, or two or more kinds thereof can be used in combination, as needed. Among these, a crosslinking agent is preferably used in order to reduce a process load or to improve physical properties of the synthetic leather.

The surface layer preferably includes a foamed layer in terms of acquisition of wrinkling and springiness unique to natural leather. In addition, the second resin layer is more preferably a foamed layer while the first resin layer is a non-foamed layer in terms of abrasion resistance. In an embodiment, for example, the polyurethane resin layer may include a first resin layer that serves as a colored layer and a second resin layer that serves as an adhesive layer, the first resin layer may be a non-foamed layer, the second resin layer may be a foamed layer, and the first resin layer may be laminated on the fibrous substrate with the second resin layer interposed therebetween.

Although the amount of dry application (dry mass per unit area) of the surface layer including both the first resin layer and the second resin layer is not particularly limited, the amount of dry application is preferably 100 to 300 g/m$^2$ and is more preferably 150 to 250 g/m$^2$. It is possible to prevent the stiffness of the synthetic leather from being low and to easily obtain springiness unique to natural leather by the amount of dry application being equal to or greater than 100 g/m$^2$. Also, it is possible to prevent abrasion resistance of the synthetic leather from being damaged. It is possible to prevent the stiffness of the synthetic leather from being high and to easily obtain wrinkling unique to natural leather by the amount of dry application being equal to or less than 300 g/m$^2$.

Although the thickness of the surface layer is not particularly limited, the thickness is preferably 100 to 300 µm and is more preferably 150 to 255 µm. It is possible to improve springiness and abrasion resistance by the thickness being equal to or greater than 100 µm. It is possible to improve wrinkling by the thickness being equal to or less than 300 µm.

The surface layer may have a grain pattern (uneven pattern) on the front surface thereof. That is, a protective layer, which will be described later, is preferably formed on the surface of the surface layer with the grain pattern.

The shape of the uneven pattern is not particularly limited, and an average length, an arithmetic average height, a maximum sectional height, a maximum height, and the like at a waviness curve of the grain pattern may be appropriately set to obtain a desired grain pattern.

<Protective Layer>

The protective layer is a part of the polyurethane resin layer laminated on the aforementioned fibrous substrate and is a polyurethane resin layer laminated on the surface layer in order to protect the surface layer laminated on the fibrous substrate. Note that the protective layer collectively indicates resin layers formed on the surface of the surface layer, and includes at least one resin layer, or can include two or more resin layers of the same or different compositions.

As the polyurethane resin used in the protective layer, a polyurethane resin similar to that used in synthetic leather known in the related art can be used. A type and a layer configuration of the polyurethane resin are not particularly limited.

Examples of the polyurethane resin include a polyether-based polyurethane resin, a polyester-based polyurethane resin, and polycarbonate-based polyurethane resin, and one kind thereof can be used alone, or two or more kinds thereof can be used in combination. Among these, a polycarbonate-based polyurethane resin is preferably used in terms of durability. Also, the polyurethane resin in any form, such as a non-solvent-based (non-solvate medium-based) polyurethane resin, a hot-melt-based polyurethane resin, a solvent-based polyurethane resin, and water-based polyurethane resin can be used, and further, a polyurethane resin in any form such a one-solution-type polyurethane resin, a two-solution curing-type polyurethane resin, and moisture curing-type polyurethane resin can be used, and appropriate selection may be made in accordance with a purpose and utilization.

With the polyurethane resin, one kind of random constituents such as a crosslinking agent, a coloring agent (a pigment or a dye), a lubricant, and a thickener can be used alone, or two or more kinds thereof can be used in combination, as needed. Among these, a crosslinking agent is preferably used in order to reduce a process load or to improve physical properties of the synthetic leather.

The protective layer has a grain pattern (uneven pattern) in the front surface thereof. The grain pattern of the protective layer may be formed by the grain pattern on the surface layer. In an embodiment, for example, the polyurethane resin layer may further include a third resin layer that is provided on the first resin layer and serves as a protective layer for protecting the first resin layer, the grain pattern may be formed on the front surface of the third resin layer, and a grain pattern similar to that in the front surface of the third resin layer may be formed on the front surface (that is, the surface in contact with the third resin layer) of the first resin layer.

In an embodiment, the protective layer may be a transparent (colorless transparent of colored transparent) resin layer.

Although the amount of dry application (dry mass per unit area) of the protective layer is not particularly limited, the amount of dry application is preferably 3 to 20 g/m$^2$ and is more preferably 4 to 15 g/m$^2$. It is possible to improve abrasion resistance of the synthetic leather by the amount of dry application being equal to or greater than 3 g/m$^2$. It is possible to prevent a texture feeling of the synthetic leather from being hard by the amount of dry application being equal to or less than 20 g/m². Also, it is possible to easily obtain wrinkling unique to natural leather.

Although the thickness of the protective layer is not particularly limited, the thickness is preferably 3 to 20 μm and is more preferably 4 to 15 μm. It is possible to improve springiness and abrasion resistance by the thickness being equal to or greater than 3 μm. It is possible to improve wrinkling by the thickness being equal to or less than 20 μm.

<Manufacturing Method>

A method for manufacturing the synthetic leather according to the embodiment is not particularly limited. In an embodiment, an example of a method for manufacturing synthetic leather provided with a surface layer including a first resin layer and a second resin layer and a protective layer that serves as a third resin layer on a circular knitted fabric that serves as a fibrous substrate will be described.

A composition containing a polyurethane resin is applied to a releasable substrate with a grain pattern (uneven pattern), and a heat treatment and an aging treatment are performed thereon as needed, thereby obtaining the first resin layer that forms a part of the surface layer.

Next, an adhesive that forms the second resin layer applied to the surface of the first resin layer, and the first resin layer is attached to the circular knitted fabric that serves as a fibrous substrate in a state in which the adhesive has viscosity. At this time, the surface to which the adhesive has been applied is preferably attached to the aforementioned small fineness surface in a case in which the front surface and the rear surface of the circular knitted fabric are formed with yarns with different single-fiber fineness.

Thereafter, a heat treatment and an aging treatment are performed as needed, and the releasable substrate is then peeled off, thereby obtaining a laminated body of the circular knitted fabric and the surface layer.

Then, a composition containing a polyurethane is applied to the surface of the surface layer of the laminated body, and a heat treatment and an aging treatment are performed as needed, thereby forming a protective layer. In this manner, synthetic leather according to the embodiment is obtained.

The releasable substrate is not particularly limited, any substrate is used as long as the substrate has releasability with respect to the polyurethane resin or a releasing treatment has been performed thereon, and examples thereof include a release paper, a releasing-treated cloth, a water repellent-treated cloth, an olefin sheet or film made of a polyethylene resin, a polypropylene resin, or the like, a fluorine resin sheet or film, and a plastic film with a release paper.

The shape of the grain pattern (uneven pattern) of the releasable substrate is not particularly limited, and an average length, an arithmetic average height, a maximum sectional height, a maximum height, and the like at a waviness curve of the grain pattern may he appropriately set to obtain a desired grain pattern.

Use of the synthetic leather according to the embodiment is not particularly limited, and the synthetic leather may be used in various applications such as clothing, bags, shoes, seat surface materials, interior material, and vehicle interior materials.

EXAMPLES

Although the invention will be described below in more detail on the basis of examples, the invention is not limited to the following examples. "Parts" in the examples are on the basis of mass unless otherwise particularly stated. Also, obtained synthetic leather was evaluated by the following methods.

[Stiffness]

Measurement was performed in accordance with the JIS L1096 8.21.1A method (45° cantilever method). At that time, the stiffness of the front surface was measured in a state in which the synthetic leather as a test piece was placed on a horizontal platform of a 45° cantilever-type tester such that the front surface thereof was directed to the upper side. Also, the stiffness of the rear surface was measured in a state in which the aforementioned synthetic leather was turned over and was placed on the horizontal platform such that the rear surface was directed to the upper side. For both the stiffness of the front surface and the stiffness of the rear surface, the measurement was performed longitudinally and transversely on five test pieces respectively, and average values of all the measured values were assumed to be the stiffness.

[Wrinkling]

Sensory evaluation was conducted in regard to states of wrinkles generated when a square sample with a side of 15 cm was placed on a palm such that the front surface thereof was directed to the upper side and was pushed in with a thumb. Evaluation was performed in accordance with the following criteria. Here, satisfactory wrinkling refers to a state in which the sample is bent at recessed portions of the grain pattern and projecting portions of the grain pattern expand more than ordinary states. Coating lifting refers to a state in which the sample is bent at every several recessed portions of the grain pattern, several recessed portions and peak portions of the grain pattern expand, and wrinkles different from the original grain pattern are generated, or the original grain pattern is blurred and turned into unnatural wrinkles. Samples in which coating lifting was observed are indicated as "(lifting)" in the table.

A: Satisfactory wrinkles along grain were generated (satisfactory wrinkling).

B: Although wrinkles along grain were generated, the wrinkles were insufficient, or slight grain lifting (coating lifting) was generated.

C: No wrinkles along grain were generated, or grain lifting was generated.

[Springiness]

Sensory evaluation was performed in regard to a rebounding feeling in a state in which a square sample with a side of 10 cm was placed on a palm and was folded into two such that the front surface or the rear surface was located inside. Evaluation was performed in accordance with the following criteria.

A: A rebounding feeling was observed on both the front and rear surfaces.

B: A slight rebounding feeling was observed on both the front and rear surfaces.

C: No rebounding feeling was observed on both the front and rear surfaces.

Example 1

<Fibrous Substrate a-1>

Figure 3:
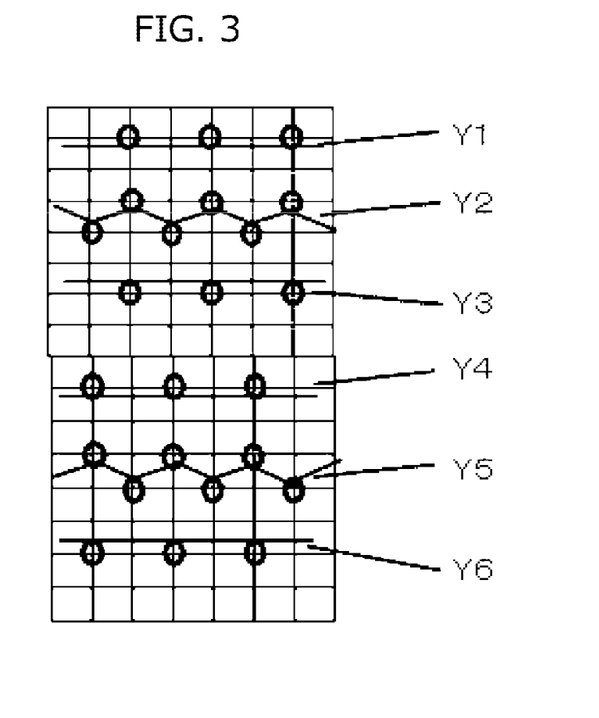
FIG. 3 is a structure diagram of a fibrous substrate in Example 1.

A 28-gauge double-knitting circular knitting machine was used, and a polyester multifilament textured yarn 84 dtex/2,88f as Y1, a polyester multifilament textured yarn 84 dtex/12f as Y2, a polyester multifilament textured yarn 167 dtex/48f as Y3, a polyester multifilament textured yarn 84 dtex/288f as Y4, a polyester multifilament textured yarn 84 dtex/12f as Y5, and a polyester multifilament textured yarn 167 dtex/148f as Y6 were used, thereby forming a circular knitted fabric with a brush knitted structure illustrated in FIG. 3. Then, dying was performed with a gray dispersed dye at 130° C. for 60 minutes using a dying machine. Next, semi-cut raising (raising treatment) was performed on a small fineness surface (a surface formed with a yarn with a small single-fiber fineness) of the circular knitted fabric. The raising treatment was performed by alternately performing raising in a knitting end direction and in a knitting start direction 13 times with a needle cloth roller torque of 2.5 MPa at a cloth speed of 12 m/minutes using a needle cloth raising machine provided with a needle roll having twelve pile rollers and twelve counter pile rollers. Next, a heat treatment was performed at 190° C. for 1 minute using a heat setter to finish the circular knitted fabric. The weight per area of the obtained circular knitted fabric (a-1) was 480 g/m$^2$, the thickness was 1.0 mm, and the density was 44 wales/25.4 mm and 97 courses/25.4 mm.

<Prescription 1>

Polycarbonate-based polyurethane resin: 100 parts
(CRISVON NY-328, solid content of 20% by mass)
Dimethylformamide (DMF): 40 parts
Carbon black pigment: 15 parts
(DIALAC BLACK L-1770S, solid content of 20% by mass)
Crosslinking agent: 2 parts
(BURNOCK DN9590, solid content of 50% by mass)
All the materials except for DMF were manufactured by DIC Corporation.

Preparation method: the viscosity was adjusted to 2,000 mPa·s (BH-type viscometer, rotor: No. 3, 10 rpm, 23° C.)

<Prescription 2>

Polycarbonate-based polyurethane resin: 90 parts
(BAYDERM Finish 61UD, solid content of 35% by mass)
Polycarbonate-based polyurethane resin: 10 parts
(HYDRHOLAC UD-2, solid content of 25% by mass)
Crosslinking agent: 1 part
(AQUADERM XL-50, solid content of 50% by mass)
Leveling agent: 1 part
(AQUADERM Fluid H, solid content of 100% by mass)
Water: 20 parts
All the materials except for water were manufactured by Lanxess Japan.

Preparation method: the viscosity was adjusted to 200 mPa·s (B-type viscometer, rotor: No. 1, 12 rpm, 23° C.).

A polyurethane resin composition (solid content of 15% by mass) prepared in accordance with the aforementioned prescription 1 was coated to a release paper (AR-209 manufactured by Asahi Roll Co., Ltd.) with a leather-like grain pattern (uneven pattern) in a sheet form using a comma coater such that the coating thickness (wet) was 147 μm, and a heat treatment was performed thereon at 100° C. for 3 minutes using a dryer, thereby forming a non-foamed first resin layer forming a part of the surface layer. The amount of dry application of the first resin layer was 30 g/m$^2$, and the thickness was 31 μm.

Next, a urethane polyisocyanate prepolymer (NH230, solid content of 100% by mass, manufactured by DIC Corporation) coated as the second resin layer onto the first resin layer in a sheet form using a comma coater such that the coating thickness (wet) was 210 μm, the second resin layer was attached to the raised surface of a circular knitted fabric (a-1) in a state in which the urethane polyisocyanate prepolymer had viscosity, and the obtained product was pressure fastened with a load of 49 N/m$^2$ using a mangle. Next, the product was subjected to an aging treatment for 3 days in an atmosphere at a temperature of 23° C. with a relative humidity of 65%, and the release paper was peeled off, thereby obtaining a laminated body of the fibrous substrate and the surface layer. The second resin layer was a foamed layer, the amount of dry application was 210 g/m$^2$, and the thickness was 210 μm. The amount of dry application of the surface layer including both the first resin layer and the second resin layer was 240 g/m$^2$, and the thickness was 241 μm.

Next, a polyurethane resin composition (solid content of 29% by mass) prepared in accordance with the prescription 2 was applied to the surface of the surface layer of the obtained laminated body with the amount of wet application of 35 g/m$^2$ using a roll coater, a heat treatment was performed thereon at 100° C. for 3 minutes using a dryer, and a protective layer was formed, thereby obtaining synthetic leather in Example 1. The amount of dry application of the protective layer was 10 g/m$^2$, and the thickness was 10 μm.

As for stiffness of the obtained synthetic leather, the stiffness of the front surface was 77 mm, and the stiffness of the rear surface was 75 mm. Also, the height of grain in the grain pattern (uneven pattern) was 105 μm, the width of grain was 1084 μm, the height of grain was 339 μm when the synthetic leather was bent, and the rate of change in grain height was 223% when the synthetic leather was bent. Wrinkling was evaluated as "A", springiness was evaluated as "A", and satisfactory wrinkling and springiness similar to those in natural leather were obtained.

Example 2

Synthetic leather was obtained similarly to Example 1, except that a release paper (R-385 manufactured by Lintec Corporation) was used as a release paper with a leather-like grain pattern (uneven pattern). As for stiffness of the obtained synthetic leather, the stiffness of the front surface was 74 mm, and the stiffness of the rear surface was 72 mm. Also, the height of grain in the grain pattern (uneven pattern) was 119 μm, the width of grain was 1408 μm, the height of grain was 358 μm when the synthetic leather was bent, and the rate of change in grain height was 201% when the synthetic leather was bent. Wrinkling was evaluated as "A", and springiness was evaluated as "A".

Example 3

Synthetic leather was obtained similarly to Example 1, except that a release paper (Rockport manufactured by Sappi Limited) was used as a release paper with a leather-like grain pattern (uneven pattern). As for stiffness of the obtained synthetic leather, the stiffness of the front surface was 79 mm, and the stiffness of the rear surface was 77 mm. Also, the height of grain in the grain pattern (uneven pattern) was 94 μm, the width of grain was 1143 μm, the height of grain was 347 μm when the synthetic leather was bent, and the rate of change in grain height was 269% when the synthetic leather was bent. Wrinkling was evaluated as "A", and springiness was evaluated as "A".

Example 4

Synthetic leather was obtained similarly to Example 1, except that a release paper (LATTE manufactured by Sappi Limited) was used as a release paper with a leather-like grain pattern (uneven pattern). As for the stiffness of the obtained synthetic leather, the stiffness of the front surface was 76 mm, and the stiffness of the rear surface was 77 mm. Also, the height of grain in the grain pattern (uneven pattern) was 66 μm, the width of grain was 1343 μm, the height of grain was 313 μm when the synthetic leather was bent, and the rate of change in grain height was 374% when the synthetic leather was bent. Wrinkling was evaluated as "A", and springiness was evaluated as "A".

Example 5

Synthetic leather was obtained similarly to Example 1, except that a release paper (R-38 manufactured by Lintec Corporation) was used as a release paper with a leather-like grain pattern (uneven pattern). As for the stiffness of the obtained synthetic leather, the stiffness of the front surface was 74 mm, and the stiffness of the rear surface was 76 mm. Also, the height of grain in the grain pattern (uneven pattern) was 59 μm, the width of grain was 1191 μm, the height of grain was 264 μm when the synthetic leather was bent, and the rate of change in grain height was 347% when the synthetic leather was bent. Wrinkling was evaluated as "A", and springiness was evaluated as "A".

Example 6

Synthetic leather was obtained similarly Example 1, except that a release paper (DE-43 manufactured by Dai Nippon Printing Co., Ltd.) was used as a release paper with a leather-like grain pattern (uneven pattern). As for the stiffness of the obtained synthetic leather, the stiffness of the front surface was 80 mm, and the stiffness of the rear surface was 80 mm. Also, the height of grain in the grain pattern (uneven pattern) was 51 μm, the width of grain was 586 μm, the height of grain was 274 μm when the synthetic leather was bent, and the rate of change in grain height was 437% when the synthetic leather was bent. Wrinkling was evaluated as "A", and springiness was evaluated as "A".

Example 7

Synthetic leather was obtained similarly to Example 1, except that the following circular knitted fabric (a-0) was used as a fibrous substrate. As for the stiffness of the obtained synthetic leather, the stiffness of the front surface was 82 mm, and the stiffness of the rear surface was 81 mm. Also, the height of grain in the grain pattern (uneven pattern) was 105 μm, the width of grain was 1084 μm, the height of grain was 258 μm when the synthetic leather was bent, and the rate of change in grain height was 146% when the synthetic leather was bent. Although wrinkling was evaluated as "B", and springiness was evaluated as "A", which were slightly insufficient, natural leather-like wrinkling along the grain was observed, and satisfactory springiness was obtained.
<Fibrous Substrate a-0>

A circular knitted fabric (a-0) was obtained similarly to the circular knitted fabric (a-1), except that a raising treatment was not performed. The weight per area of the obtained circular knitted fabric (a-0) was 487 g/m², the thickness was 0.98 mm, and the density was 84 wales/25.4 mm and 80 courses/25.4 mm.

Example 8

Synthetic leather was obtained similarly to Example 3, except that the following circular knitted fabric (a-4) was used as a fibrous substrate. As for stiffness of the obtained synthetic leather, the stiffness of the front surface was 79 mm, and the stiffness of the rear surface was 78 mm. Also, the height of grain in the grain pattern (uneven pattern) was 94 μm, the width of grain was 1143 μm, the height of grain was 518 μm when the synthetic leather was bent, and the rate of change in grain height was 451% when the synthetic leather was bent. Although wrinkling was evaluated as "B", and springiness was evaluated as "A", which were slightly insufficient, natural leather-like wrinkling along the grain was observed, and satisfactory springiness was obtained.
<Fibrous Substrate a-4>

A circular knitted fabric (a-4) was obtained similarly to the circular knitted fabric (a-1), except that four sets of raising treatment were performed on the assumption that the raising treatment for the aforementioned circular knitted fabric (a-1) was counted as one set. The weight per area of the obtained circular knitted fabric (a-4) was 484 g/m², the thickness was 1.07 mm, and the density was 84 wales/25.4 mm and 80 courses/25.4 mm.

Example 9

Synthetic leather was obtained similarly to Example 4, except that the circular knitted fabric (a-0) was used as a fibrous substrate. As for stiffness of the obtained synthetic leather, the stiffness of the front surface was 84 mm, and the stiffness of the rear surface was 85 mm. Also, the height of grain in the grain pattern (uneven pattern) was 66 μm, the width of grain was 1343 μm, the height of grain was 119 μm when the synthetic leather was bent, and the rate of change in grain height was 80% when the synthetic leather was bent. Although wrinkling was evaluated as "B", and springiness was evaluated as "A", which were slightly insufficient, natural leather-like wrinkling was observed, and satisfactory springiness was obtained.

Example 10

Synthetic leather was obtained similarly to Example 4, except that the circular knitted fabric (a-4) was used as a fibrous substrate. As for stiffness of the obtained synthetic leather, the stiffness of the front surface was 71 mm, and the stiffness of the rear surface was 71 mm. Also, the height of grain in the grain pattern (uneven pattern) was 66 μm, the width of grain was 1343 μm, the height of grain was 464 μm when the synthetic leather was bent, and the rate of change in grain height was 603% when the synthetic leather was bent. Wrinkling was evaluated as "B", and springiness was evaluated as "A". Although slight coating lifting was observed, natural leather-like wrinkling was basically observed, and satisfactory springiness was obtained.

Example 11

Synthetic leather was obtained similarly to Example 1, except that the following circular knitted fabric (c-1) was used as a fibrous substrate. As for stiffness of the obtained synthetic leather, the stiffness of the front surface was 67 mm, and the stiffness of the rear surface was 58 mm. Also, the height of grain in the grain pattern (uneven pattern) was 105 μm, the width of grain was 1084 μm, the height of grain was 388 μm when the synthetic leather was bent, and the rate of change in grain height was 270% when the synthetic leather was bent. Although wrinkling was evaluated as "B", and springiness was evaluated as "B", which were slightly insufficient, natural leather-like wrinkling along the grain was observed, and springiness was obtained.

<Fibrous Substrate c-1>

A circular knitted fabric (c-1) was obtained similarly to the circular knitted fabric (a-1), except that a polyester multifilament textured yarn 110 dtex/24f was used as Y1 and Y4 and a polyester multifilament textured yarn 110 dtex/36f was used as Y2 and Y5. The weight per area of the obtained circular knitted fabric (c-1) was 455 g/m$^2$, the thickness was 0.95 mm, and the density was 39 wales/25.4 mm and 41 courses/25.4 mm.

Example 12

Synthetic leather was obtained similarly to Example 1, except that the amount of dry application for the second resin layer was set to 260 g/m$^2$ and the thickness was set to 260 μm. As for stiffness of the obtained synthetic leather, the stiffness of the front surface was 93 mm, and the stiffness of the rear surface was 84 mm. Also, the height of grain in the grain pattern (uneven pattern) was 105 μm, the width of grain was 1084 μm, the height of grain was 302 μm when the synthetic leather was bent, and the rate of change in grain height was 188% when the synthetic leather was bent. Although wrinkling was evaluated as "B", and springiness was evaluated as "A", which were slightly insufficient, natural leather-like wrinkling along the grain was observed, and satisfactory springiness was obtained.

Comparative Example 1

Synthetic leather was obtained similarly to Example 1, except that the following circular knitted fabric (b-0) was used as a fibrous substrate. As for stiffness of the obtained synthetic leather, the stiffness of the front surface was 52 mm, and the stiffness of the rear surface was 52 mm. Also, the height of grain in the grain pattern (uneven pattern) was 105 μm, the width of grain was 1084 μm, the height of grain was 118 μm when the synthetic leather was bent, and the rate of change in grain height was 12% when the synthetic leather was bent. Wrinkling was evaluated as "C", springiness was evaluated as "C", and wrinkling and springiness were inferior.

<Fibrous Substrate b-0>

Figure 4:
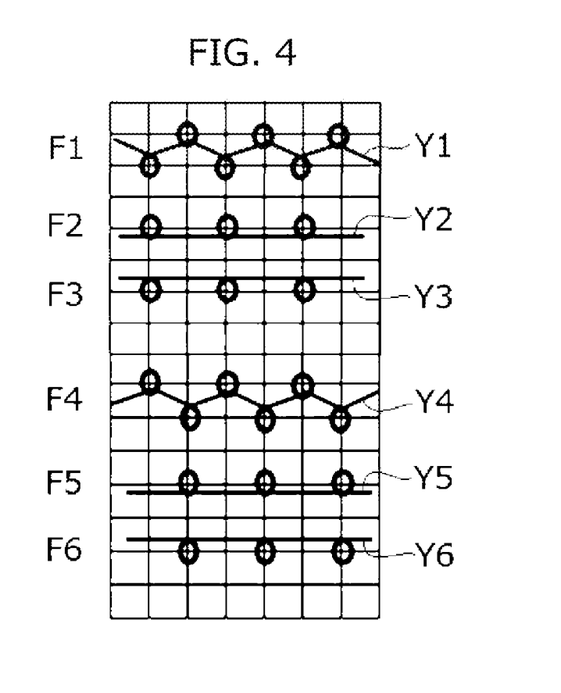
FIG. 4 is a structure diagram of a fibrous substrate in Comparative Example 1.

A 28-gauge double-knitting circular knitting machine was used, polyester multifilament textured yarn 220 dtex/72f was used as Y1 to Y6, thereby forming a circular knitted fabric with a mock lodi knitted structure illustrated in FIG. 4. Then, dying was performed with a gray dispersed dye at 130° C. for 60 minutes using a dying machine. Next, a heat treatment was performed at 190° C. for 1 minute using a heat setter to finish the circular knitted fabric. The weight per area of the obtained circular knitted fabric (b-0) was 320 g/m$^2$, the thickness was 0.70 mm, and the density was 35 wales/25.4 mm and 43 courses/25.4 mm.

Comparative Example 2

Synthetic leather was obtained similarly to Example 1, except that the following circular knitted fabric (b-1) was used as a fibrous substrate. As for the stiffness of the obtained synthetic leather, the stiffness of the front surface was 52 mm, and the stiffness of the rear surface was 52 mm. Also, the height of grain in the grain pattern (uneven pattern) was 105 μm, the width of grain was 1084 μm, the height of grain was 506 μm when the synthetic leather was bent, and the rate of change in grain height was 382% when the synthetic leather was bent. Wrinkling was evaluated as "B", springiness was evaluated as "C", slight coating lifting was observed in regard to the wrinkling, and springiness was inferior.

<Fibrous Substrate b-1>

A 28-gauge double-knitting circular knitting machine was used, polyester multifilament textured yarn 220 dtex/72f was used as Y1 to Y6, thereby forming a circular knitted fabric with a mock lodi knitted structure illustrated in FIG. 4. Then, dying was performed with a gray dispersed dye at 130° C. for 60 minutes using a dying machine. Next, a heat treatment was performed at 190° C. for 1 minute using a heat setter to finish the circular knitted fabric. Next, semi-cut raising (raising treatment) was performed on one surface of the circular knitted fabric. The raising treatment was performed by alternately performing raising in a knitting end direction and in a knitting start direction 13 times with a needle cloth roller torque of 2.5 MPa at a cloth speed of 1 m/minutes using a needle cloth raising machine provided with a needle roll having twelve pile rollers and twelve counter pile rollers. The weight per area of the obtained circular knitted fabric (b-1) was 329 g/m$^2$, the thickness was 0.72 mm, and the density was 35 wales/25.4 mm and 43 courses/25.4 mm.

Comparative Example 3

Synthetic leather was obtained similarly to Example 1, except that the following circular knitted fabric (b-4) was used as a fibrous substrate. As for the stiffness of the obtained synthetic leather, the stiffness of the front surface was 52 mm, and the stiffness of the rear surface was 50 mm. Also, the height of grain in the grain pattern (uneven pattern) was 105 μm, the width of grain was 1084 μm, the height of grain was 613 μm when the synthetic leather was bent, and the rate of change in grain height was 484% when the synthetic leather was bent. Wrinkling was evaluated as "C", springiness was evaluated as "C", and wrinkling and springiness were inferior.

<Fibrous Substrate b-4>

A circular knitted fabric (b-4) was obtained similarly to the circular knitted fabric (b-1), except that four sets of raising treatment were performed on the assumption that the raising treatment for the aforementioned circular knitted fabric (b-1) was counted as one set. The weight per area of the obtained circular knitted fabric (b-4) was 330 g/m$^2$, the thickness was 0.76 mm, and the density was 35 wales/25.4 mm and 43 courses/25.4 mm.

Comparative Example 4

Synthetic leather was obtained similarly to Example 1, except that the amount of dry application for the second resin layer was set to 300 g/m$^2$ and the thickness was set to 300 μm. As for the stiffness of the obtained synthetic leather, the stiffness of the front surface was 100 mm, and the stiffness of the rear surface was 92 mm. Also, the height of grain in the grain pattern (uneven pattern) was 105 μm, the width of grain was 1084 μm, the height of grain was 179 μm when the synthetic leather was bent, and the rate of change in grain height was 70% when the synthetic leather was bent. Although wrinkling was evaluated as "C", springiness was evaluated as "A", and satisfactory springiness was obtained, wrinkling was inferior.

Configurations and evaluation results of the synthetic leather in the aforementioned examples and comparative examples are shown in Tables 1 and 2 below.

TABLE 1

|  |  | Example 1 | Example 2 | Example 3 | Example 4 | Example 5 | Example 6 | Example 7 |
|---|---|---|---|---|---|---|---|---|
| Fibrous substrate: | Type | a-1 | a-1 | a-1 | a-1 | a-1 | a-1 | a-0 |
|  | Weight per area (g/m$^2$) | 480 | 480 | 480 | 480 | 480 | 480 | 487 |
|  | Thickness (mm) | 1.0 | 1.0 | 1.0 | 1.0 | 1.0 | 1.0 | 0.98 |
|  | Wale density (w/25.4 mm) | 44 | 44 | 44 | 44 | 44 | 44 | 44 |
|  | Course density (c/25.4 mm) | 97 | 97 | 97 | 97 | 97 | 97 | 97 |
| Release paper |  | AR-209 | R-385 | Rockport | LATTE | R-38 | DE-43 | AR-209 |
| First resin layer: | Amount of dry application (g/m$^2$) | 30 | 30 | 30 | 30 | 30 | 30 | 30 |
|  | Thickness (μm) | 31 | 31 | 31 | 31 | 31 | 31 | 31 |
| Second resin layer | Amount of dry application (g/m$^2$) | 210 | 210 | 210 | 210 | 210 | 210 | 210 |
|  | Thickness (μm) | 210 | 210 | 210 | 210 | 210 | 210 | 210 |
| Protective layer | Amount of dry application (g/m$^2$) | 10 | 10 | 10 | 10 | 10 | 10 | 10 |
|  | Thickness (μm) | 10 | 10 | 10 | 10 | 10 | 10 | 10 |
| Surface layer | Amount of dry application (g/m$^2$) | 240 | 240 | 240 | 240 | 240 | 240 | 240 |
|  | Thickness (μm) | 241 | 241 | 241 | 241 | 241 | 241 | 241 |
| Polyurethane resin layer | Amount of dry application (g/m$^2$) | 250 | 250 | 250 | 250 | 250 | 250 | 250 |
|  | Thickness (μm) | 251 | 251 | 251 | 251 | 251 | 251 | 251 |
| Height of grain (μm) |  | 105 | 119 | 94 | 66 | 59 | 51 | 105 |
| Width of grain (μm) |  | 1084 | 1408 | 1143 | 1343 | 1191 | 586 | 1084 |
| Height of grain when bent (μm) |  | 339 | 358 | 347 | 313 | 264 | 274 | 258 |
| Rate of change in grain height when bent (%) |  | 223 | 201 | 269 | 374 | 347 | 437 | 146 |
| Stiffness | Front surface (min) | 77 | 74 | 79 | 76 | 74 | 80 | 82 |
|  | Rear surface (mm) | 75 | 72 | 77 | 77 | 76 | 80 | 81 |
| Wrinkling |  | A | A | A | A | A | A | B |
| Springiness |  | A | A | A | A | A | A | A |

|  |  | Example 8 | Example 9 | Example 10 | Example 11 | Example 12 |
|---|---|---|---|---|---|---|
| Fibrous substrate: | Type | a-4 | a-0 | a-4 | c-1 | a-1 |
|  | Weight per area (g/m$^2$) | 484 | 487 | 484 | 455 | 480 |
|  | Thickness (mm) | 1.07 | 0.98 | 1.07 | 0.95 | 1.0 |
|  | Wale density (w/25.4 mm) | 44 | 44 | 44 | 39 | 44 |
|  | Course density (c/25.4 mm) | 97 | 97 | 97 | 41 | 97 |
| Release paper |  | Rockport | LATTE | LATTE | AR-209 | AR-209 |
| First resin layer: | Amount of dry application (g/m$^2$) | 30 | 30 | 30 | 30 | 30 |
|  | Thickness (μm) | 31 | 31 | 31 | 31 | 31 |
| Second resin layer | Amount of dry application (g/m$^2$) | 210 | 210 | 210 | 210 | 260 |
|  | Thickness (μm) | 210 | 210 | 210 | 210 | 260 |
| Protective layer | Amount of dry application (g/m$^2$) | 10 | 10 | 10 | 10 | 10 |
|  | Thickness (μm) | 10 | 10 | 10 | 10 | 10 |
| Surface layer | Amount of dry application (g/m$^2$) | 240 | 240 | 240 | 240 | 290 |
|  | Thickness (μm) | 241 | 241 | 241 | 241 | 291 |
| Polyurethane resin layer | Amount of dry application (g/m$^2$) | 250 | 250 | 250 | 250 | 300 |
|  | Thickness (μm) | 251 | 251 | 251 | 251 | 301 |
| Height of grain (μm) |  | 94 | 66 | 66 | 105 | 105 |
| Width of grain (μm) |  | 1143 | 1343 | 1343 | 1084 | 1084 |
| Height of grain when bent (μm) |  | 518 | 119 | 464 | 388 | 302 |
| Rate of change in grain height when bent (%) |  | 451 | 80 | 603 | 270 | 188 |
| Stiffness | Front surface (min) | 79 | 84 | 71 | 67 | 93 |
|  | Rear surface (mm) | 78 | 85 | 71 | 58 | 84 |
| Wrinkling |  | B | B | B (lifting) | B | B |
| Springiness |  | A | A | A | B | A |

TABLE 2

|  |  | Comparative Example 1 | Comparative Example 2 | Comparative Example 3 | Comparative Example 4 |
|---|---|---|---|---|---|
| Fibrous substrate | Type | b-0 | b-1 | b-4 | a-1 |
|  | Weight per area (g/m$^2$) | 320 | 329 | 330 | 480 |
|  | Thickness (mm) | 0.70 | 0.72 | 0.76 | 1.0 |
|  | Wale density (w/25.4 mm) | 35 | 35 | 35 | 44 |
|  | Course density (c/25.4 mm) | 43 | 43 | 43 | 97 |

TABLE 2-continued

|  |  | Comparative Example 1 | Comparative Example 2 | Comparative Example 3 | Comparative Example 4 |
|---|---|---|---|---|---|
| Release paper |  | AR-209 | AR-209 | AR-209 | AR-209 |
| First resin layer | Amount of dry application (g/m$^2$) | 30 | 30 | 30 | 30 |
|  | Thickness (μm) | 31 | 31 | 31 | 31 |
| Second resin layer | Amount of dry application (g/m$^2$) | 210 | 210 | 210 | 300 |
|  | Thickness (μm) | 210 | 210 | 210 | 300 |
| Protective layer | Amount of dry application (g/m$^2$) | 10 | 10 | 10 | 10 |
|  | Thickness (μm) | 10 | 10 | 10 | 10 |
| Surface layer | Amount of dry application (g/m$^2$) | 240 | 240 | 240 | 330 |
|  | Thickness (μm) | 241 | 241 | 241 | 331 |
| Polyurethane resin layer | Amount of dry application (g/m$^2$) | 250 | 250 | 250 | 340 |
|  | Thickness (μm) | 251 | 251 | 251 | 341 |
| Height of grain (μm) |  | 105 | 105 | 105 | 105 |
| Width of grain (μm) |  | 1084 | 1084 | 1084 | 1084 |
| Height of grain when bent (μm) |  | 118 | 506 | 613 | 179 |
| Rate of change in grain height when bent (%) |  | 12 | 382 | 484 | 70 |
| Stiffness | Front surface (mm) | 52 | 52 | 52 | 100 |
|  | Rear surface (mm) | 52 | 52 | 50 | 92 |
| Wrinkling |  | C | B (lifting) | C (lifting) | C |
| Springiness |  | C | C | C | A |

REFERENCE SIGNS LIST

1 Synthetic leather
2 Fibrous substrate
3 Second resin layer (adhesive layer)
4 First resin layer (colored layer)
5 Surface layer
6 Third resin layer (protective layer)
7 Polyurethane resin layer
8 Front surface

The invention claimed is:

1. Synthetic leather comprising:
a fibrous substrate; and
a polyurethane resin layer that is laminated onto the fibrous substrate,
the synthetic leather having a grain pattern on a front surface, the front surface being on a side of the polyurethane resin layer,
wherein a stiffness of the front surface of the synthetic leather is 65 to 95 mm and a stiffness of a rear surface of the synthetic leather is 55 to 85 mm,
wherein a dry mass per unit area of the polyurethane resin layer is 120 to 320 g/m$^2$, and
wherein a thickness of the polyurethane resin layer is 120 to 320 μm.

2. The synthetic leather according to claim 1, wherein a height of grain in the grain pattern is equal to or greater than 50 μm.

3. The synthetic leather according to claim 1, wherein a width of grain in the grain pattern is equal to or greater than 580 μm.

4. The synthetic leather according to claim 1, which shows a rate of change in grain height in the grain pattern of 100 to 550% when the synthetic leather is bent.

5. The synthetic leather according to claim 1, wherein the fibrous substrate is a circular knitted fabric with a circular interlock knitted structure with one surface or both surfaces formed as a raised surface, and the polyurethane resin layer is laminated on the raised surface.

6. The synthetic leather according to claim 1, wherein one surface of the fibrous substrate is formed using a yarn with a smaller single-fiber fineness than that of the other surface, and the polyurethane resin layer is laminated on the one surface.

7. The synthetic leather according to claim 1, wherein the polyurethane resin layer comprises a first resin layer that serves as a colored layer and a second resin layer that serves as an adhesive layer, the first resin layer is a non-foamed layer, the second resin layer is a foamed layer, and the first resin layer is laminated on the fibrous substrate with the second resin layer interposed therebetween.

8. The synthetic leather according to claim 7, wherein the polyurethane resin layer further comprises a third resin layer that is provided on the first resin layer and serves as a protective layer for protecting the first resin layer, the grain pattern is formed in a front surface of the third resin layer, and a grain pattern similar to the grain pattern in the front surface of the third resin layer is formed in a front surface of the first resin layer.

9. The synthetic leather according to claim 1, wherein a mass per unit area of the fibrous substrate is 350 to 600 g/m$^2$.

10. The synthetic leather according to claim 9, wherein a thickness of the fibrous substrate is 0.9 to 1.2 mm.

11. The synthetic leather according to claim 1, wherein the dry mass per unit area of the polyurethane resin layer is 200 to 270 g/m$^2$.

12. The synthetic leather according to claim 1, wherein the polyurethane resin layer comprises a foamed adhesive layer, a non-foamed colored resin layer, and a protective layer, arranged in this order on the fibrous substrate, and
wherein the grain pattern is formed in the protective layer and the colored resin layer.

* * * * *